April 21, 1925.
J. G. B. RORICK ET AL
1,534,869
SAFETY ADJUSTING MECHANISM FOR AUTOMOBILE HEADLIGHTS
Filed Feb. 14, 1924
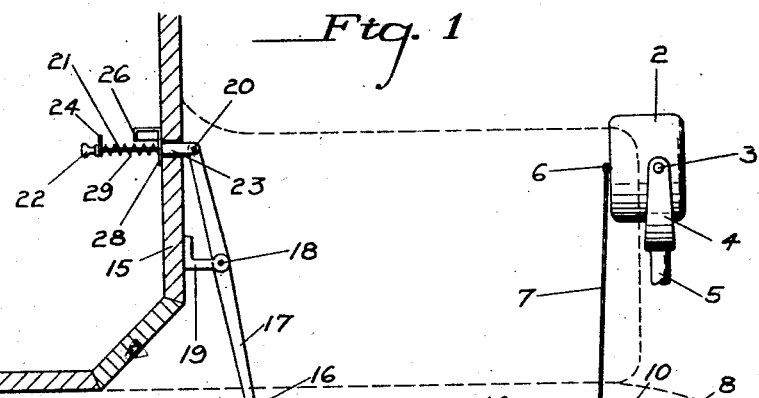
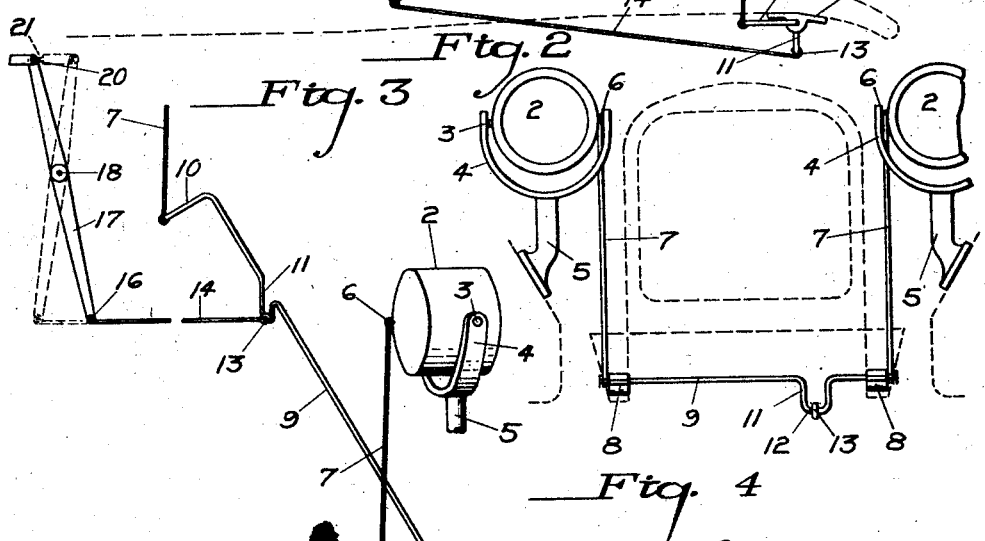
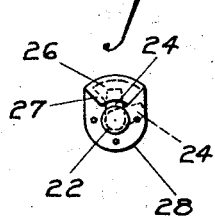
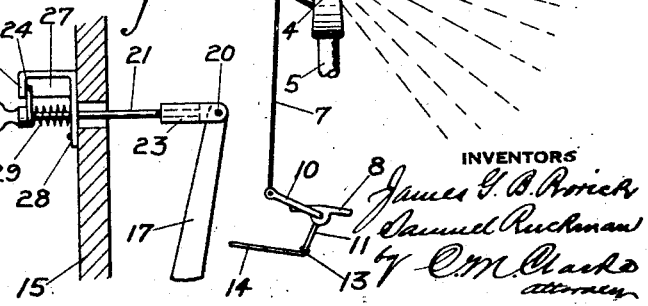

Patented Apr. 21, 1925.

1,534,869

UNITED STATES PATENT OFFICE.

JAMES G. B. RORICK AND SAMUEL RUCKMAN, OF WOODLAWN, PENNSYLVANIA.

SAFETY ADJUSTING MECHANISM FOR AUTOMOBILE HEADLIGHTS.

Application filed February 14, 1924. Serial No. 692,692.

*To all whom it may concern:*

Be it known that we, JAMES G. B. RORICK and SAMUEL RUCKMAN, citizens of the United States, residing at Woodlawn, in the county of Beaver and State of Pennsylvania, have invented certain new and useful Improvements in Safety Adjusting Mechanism for Automobile Headlights, of which the following is a specification.

Our invention refers to improvements in adjustable headlights for automobiles and the like. It has for its object to provide simple, economical, direct-acting, safety mechanism for the purpose of maintaining the headlights in normal level or horizontal position, and for immediately lowering them so as to divert the light beams downwardly below the range of vision of drivers of oncoming vehicles.

In previous constructions having the same general object or purpose in view, various forms of manipulating mechanism have been devised for tilting the headlight lamps through various mechanisms, all of which are more or less complicated, uncertain, and expensive.

In our present invention, we provide means for positively and securely maintaining the headlight in normal position by means of simple, direct, and movement-imparting and holding mechanism, and provide a positive and continuously reliable locking device within easy range of the operator, and capable of immediate release and of re-adjustment with a continuous positive and safe connection at all times.

In the drawings, showing one preferred embodiment or installation of the invention, Fig. 1 is a view of the mechanism in side elevation, as mounted on the framework of an automobile;

Fig. 2 is an end view of Fig. 1;

Fig. 3 is a detached perspective view, showing the operating mechanism in detail;

Fig. 4 is a view of one of the headlights in side elevation, titled downwardly;

Figs. 5 and 6 are detail views of the releasing and locking mechanism for actuating the tilting means.

In carrying out our invention, each of the headlights or lamps 2, which may be of the modern "drum" form, or other suitable design, is pivotally mounted at 3 between the arms of a supporting bracket 4, mounted by stem 5 on the fender or other suitable framework of the machine. Rearwardly of pivotal mounting 3 is a pivotal connection 6, preferably at the inner side of each lamp, with a connecting rod 7, extending downwardly as shown.

Extending across under the chassis form, and preferably below the usual radiator, rotatably mounted in bearings 8, is a continuous one-piece rock shaft 9. Said shaft is provided at each outer end with the lever arm terminals 10 extending rearwardly, and so arranged with relation to the direction of movement of connecting rod 7 as to impart to them the desired upward or downward movement, with proper leverage action, when the rock shaft 9 is rotated. Said shaft is provided with a U-shaped double sided crank arm 11, as shown in Figs. 2 and 3, preferably at one side of the middle, and approximating the position of the driver.

Pivotally connected with the wrist pin 12 of arms 11 by terminal 13, is the connecting rod 14, extending backwardly between the side members of the chassis frame and through suitable clearance space under the engine space cavity, and terminating at a point slightly in front of the usual dash board 15. The rear terminal of connecting rod 14 is pivotally connected at 16 with the lower end of an operating lever 17, which is pivotally connected at 18 to a bracket 19 extending outwardly from the front of the dash board, or otherwise mounted as desired.

The upper terminal of lever 17 is pivotaly connected at 20 with the forward end of an operating stem 21, which extends backwardly through the dash board, and is provided with a terminal operating button 22. Stem 21 is rotatably connected with the pivoting terminal 20 by a sleeve 23, within which the end of stem 21 may rotate, being retained therein by the terminal button or nut, as will be readily understood. If desired, however, the button 22 may be swiveled on the other end of rod 21 for turning. Button 22, which is adapted to be grasped by the fingers for rotation, is also provided with a fixedly connected outwardly extending locking arm 24 having a lip terminal. Said terminal is adapted to fit behind the annular flange 26 and against an abutting terminal 27 of an escutcheon plate extending outwardly from a bracket 28 secured against the inner face of the dash.

Between the inner portion of button 22, or locking arm 24, and the face of plate 28, is a spiral spring 29 of sufficient strength to exert a double-acting outward pressure against stem 21 when the locking terminal 24 is released by a slight turn, as indicated in dotted lines in Fig. 6. Thereupon, the action of spring 29 exerts an inward pulling effect on the upper arm of lever 17, thrusting connecting rod 14 outwardly to a corresponding degree, with the resulting effect of throwing lever arms 10 downwardly to bring the headlight to level position, as in Fig. 1.

Upon thrusting stem 21 inwardly and re-rotating locking arm 24 to engage and become locked underneath the holding escutcheon frame 26 and against abutment 27, the headlights will become tilted downwardly, as in Fig. 4, and will be there held safely and positively by such interlocking engagement. In such position, the rays of the lamp are not only positively lowered well below the line of vision, but the headlight is as positively maintained in such position by the locking of arm 24 behind flange 26. The objectionable glare of the lamps is, therefore, completely overcome and without any diminution of the light beams, the full value of which is utilized on the roadway, immediately in front of the machine.

The construction of the invention and its advantages will be readily understood and appreciated from the foregoing description. It is extremely simple, very reliable and effective in operation, and of low cost. It may be made to suit various constructions of machines and design of lamps merely by suitably designing the several parts as to their mounting and connection with the standard construction to be equipped.

The invention may be variously changed or modified in various details by the skilled mechanic, but all such are to be considered as within the scope of the following claims.

What we claim is:

1. A safety adjusting mechanism for automobile headlights comprising a one-piece rock shaft having terminal lever arms and an intermediate lever, lamp engaging rods pivotally connected to said arms and having lamp connecting terminals, an operating lever connected with the intermediate lever, and a spring retracted operating rod connected with the operating lever and provided with a locking device.

2. A safety adjusting mechanism for automobile headlights comprising a one-piece rock shaft having terminal lever arms pivotally connected to lamp engaging rods and having an intermediate lever, an operating lever connected therewith, and a spring retracted operating rod connected with the operating lever and provided with a rotatable locking latch, and a holding and retaining keeper therefor.

3. Safety adjusting mechanism for automobile headlights comprising in combination with a pair of pivotally mounted headlights, a one-piece rock shaft having terminal lever arms and an intermediate lever, a connecting rod pivoted to each lever and to each lamp beyond its pivotal mounting, a vertically arranged pivoted operating lever having a connecting rod pivoted thereto and to the intermediate lever of the rock shaft, an operating stem pivotally and rotatably connected to the upper end of the operating lever and provided at one end with a turning button and a locking arm, a holding escutcheon for locking engagement with the locking arm and having a securing base, and a spring between the base and the locking arm.

4. The combination with an automobile having a chassis, a dash on the chassis, and a pair of headlights pivotally supported to move about a horizontal axis, of a transverse rock shaft supported on the chassis and having levers at the ends thereof and a crank thereon, vertical rods connecting the levers with the headlights, a vertically extending lever transversely pivoted at the front of the dash, a link connecting the vertical lever and crank, and an operating rod connected with the upper end of the vertical lever and passing through the dash.

5. A safety lock for controlling the shifting lever of adjustable automobile headlights consisting of a stem having a swiveled terminal for connection with a shifting lever and an operating button at its other end, a rotatable locking arm, a holding escutcheon for the locking arm, and a spring surrounding the stem and engaging the holding arm for retraction thereof when released from the escutcheon.

6. A safety lock for controlling the shifting lever of adjustable automobile headlights consisting of a stem having a swiveled terminal for connection with a shifting lever and an operating button at its other end, a rotatable locking arm having a locking terminal, a holding escutcheon for the locking arm having a co-acting locking and limiting abutment, and a spring surrounding the stem and engaging the holding arm for retraction thereof when released from the escutcheon.

In testimony whereof we hereunto affix our signatures.

JAMES G. B. RORICK.
SAMUEL RUCKMAN.